United States Patent [19]

Welch et al.

[11] 3,956,098
[45] May 11, 1976

[54] APPARATUS CONTAINING SILICON METAL JOINTS

[75] Inventors: Cletus N. Welch, Clinton; Aleksandrs Martinsons, Wadsworth, both of Ohio

[73] Assignee: PPG Industries, Inc., Pittsburgh, Pa.

[22] Filed: Jan. 29, 1975

[21] Appl. No.: 544,986

Related U.S. Application Data

[62] Division of Ser. No. 426,414, Dec. 19, 1973.

[52] U.S. Cl. ............................. 204/286; 29/195
[51] Int. Cl.² ....................... C25B 11/00; B23P 3/00
[58] Field of Search ............. 204/16, 286; 29/473.1, 29/472.5, 472.9, 194, 195

[56] References Cited
UNITED STATES PATENTS

| | | |
|---|---|---|
| 2,053,765 | 9/1936 | Dana .................................. 204/16 |
| 3,287,794 | 11/1966 | Van Hise ........................... 29/473.1 |
| 3,302,961 | 2/1967 | Franklin ............................. 29/473.1 |
| 3,445,212 | 5/1969 | Bishop ............................... 29/473.1 |
| 3,507,979 | 4/1970 | Erkan ................................. 29/473.1 |
| 3,551,997 | 1/1971 | Etter .................................. 29/473.1 |
| 3,703,306 | 11/1972 | LaChance ......................... 29/473.1 |

Primary Examiner—T. M. Tufariello
Attorney, Agent, or Firm—Richard M. Goldman

[57] ABSTRACT

Disclosed is a method of joining a silicon metal work piece to a second metallic work piece. In the disclosed method, an adherent surface is provided on the silicon work piece. A pool is then provided on the surface of the silicon, in contact with the adherent surface and with the second metallic work piece. The pool is then solidified to join the silicon work piece and the second work piece.

1 Claim, 3 Drawing Figures

APPARATUS CONTAINING SILICON METAL JOINTS

This is a division of application Ser. No. 426,414 filed Dec. 19, 1973.

BACKGROUND OF THE INVENTION

Electrolytic cells containing silicon anodes are disclosed in U.S. Pat. application Ser. No. 260,790 filed June 8, 1972, by Howard H. Hoekje for "Electrodes Having Silicon Base Members", now abandoned, U.S. application Ser. No. 336,288 filed Feb. 27, 1973, by Howard H. Hoekje for "Electrodes Having Silicon Base Members", now U.S. Pat. No. 3,852,175 and U.S. application Ser. No. 356,972 filed May 3, 1973, by Howard H. Hoekje for "Electrolytic Cell for the Electrolysis of Alkali Metal Chlorides Having Bipolar Electrodes" now abandoned.

While silicon is a particularly satisfactory material from an electrochemical viewpoint, available expedients of working with silicon has tended to limit its application to cells or relatively simple geometry. For example, silicon electrodes cannot be simply inserted in electrolytic cells intended for use with metal anodes of the type known in the prior art, e.g., precious metal-coated titanium anodes.

Another problem limiting the wider use of silicon has been the difficulty in welding silicon. A related problem has been the difficulty of making removable silicon elements, e.g., silicon elements having the capability of being bolted onto other metallic elements. Both of these problems are inter-related, and are due to the shear strength and thermal expansion properties of silicon, as well as to the difficulty of obtaining a satisfactory metallurgical bond between silicon and the available solders and welding fluxes.

SUMMARY OF INVENTION

A method has now been found for welding silicon surfaces to other metallic surfaces, i.e., silicon, iron, steel, nickel, copper, aluminum, titanium, tantalum, or the like. The method of this invention further permits bolt means, threaded means, stud means, conductor means, and the like, to be welded to silicon elements, thereby providing readily removable silicon elements such as readily removable anodes, bipolar backplates, bipolar electrodes, cell walls, cell tops, and the like.

In joining the surface of the silicon work piece to the surface of a second work piece or element, the silicon is initially provided with an adherent surface.

A molten metal pool is then provided on the surface of the silicon work piece in contact with the adherent surface, and in contact with the second work piece, i.e., the work piece to be joined to the silicon. The two work pieces are cooled, for example, by removing the source of heat, thereby joining the silicon and the second metallic work piece in a strong bond or joint.

DETAILED DESCRIPTION OF THE INVENTION

Disclosed is a method of joining silicon metal to other metals so as to provide a strong, electroconductive bond or joint between the silicon member and the second metal. By a strong bond is meant a bond or joint having a tensile strength greater than the tensile strength of silicon, i.e., a tensile strength greater than about 800 pounds per square inch. By an electroconductive bond is meant one have a contact resistance of less than $2 \times 10^{-3}$ ohm.

According to this invention, a bond is provided between the surface of a silicon work piece and a bonding material, and between the bonding material and the surface of a second metal work piece or member.

The method of joining silicon to other metals may be used to connect silicon electrodes to iron or copper conductors, or to threaded metal studs or rods, for use in electrolytic cells. Additionally, the method of this invention may be used to join studs or bolts or the like to silicon so that the silicon members may be bolted to other elements to provide useful structures such as containers, baffles, and the like.

The method of joining a silicon work piece or member to a second metallic work piece or member includes the step of first providing an adherent surface upon the surface of the silicon where the silicon is to be joined to the second metal. Then, a liquid pool of a bonding material is formed on the surface of the adherent material. Next, the second metallic member or work piece is maintained in contact with the bonding material. When the bonding material is a metallic material, the work pieces are thereafter cooled, for example, by removing the source of heat, to a temperature below the solidification temperature of the molten metal pool and of the alloys formed by the material used in forming the molten metal pool with silicon and with the second metal. Alternatively, where the bonding material is an adhesive or a resinous material, the bonding material is allowed to set or cure. In this way, a strong bond or joint is formed.

An adherent surface must be formed on the surface of the silicon work piece or member. That is, the surface of the silicon member must be treated so as to enable a bond or joint to be formed between the silicon and the bonding material. The treatment of the surface may be accomplished by several exemplifications. For example, the surface of the silicon may be treated with a metal that forms an adherent bond with the silicon and with the bonding material. Or, the surface of the silicon may be treated so as to render the silicon surface wettable by the bonding material.

According to one exemplification of this invention, a coating is provided on the surface of the silicon work piece that bonds tightly to the silicon and to the bonding material. Preferably, the adherent surface is provided by a metal or alloy having properties of high electrical conductivity, a low dihedral wetting angle or a low surface energy or both, and, in the case of a metallic bonding material, form solid solutions with the metallic bonding material. Exemplary metals include copper, nickel, tin, aluminum, zinc, silver, palladium, platinum, and gold. Most commonly, copper or nickel is used.

The material used to provide the adherent surface may be electroplated onto the surface of the silicon. This may be done from aqueous solution, or from organic solution, or even from a molten salt. Typical aqueous electrolytes include sulfate solution, nitrate solution, nitrite solution, chloride solution, chlorate solution, phosphate solution, phosphite solution, or any electrolyte capable of providing substantially complete disassociation in the electrolyte. A particularly desirable electroplating solution is aqueous copper sulfate containing from about 210 to about 220 grams per liter of copper sulfate, although more concentrated or more dilute solutions may be used.

The electroplating typically continues for from about 20 minutes to about 30 minutes at a current density of from about 20 Amperes per square foot to about 30 Amperes per square foot, although higher or lower current densities may be used. The electroplating is carried on sufficiently long to render the silicon surface wettable by the metallic bonding material. The electroplated material substantially covers the surface of the silicon at the point where the bond is to be provided, so that the surface is substantially free of pinholes and the like. As a rule, the surface is at least 50 micro inches thick. Preferably, the surface is in excess of 300 micro inches thick, and generally in excess of about 500 micro inches thick. The surface may be as thick as 800 micro inches and frequently as thick as 1,000 micro inches.

Treating the surface in the method described above allows the use of metallic bonding materials having low melting points such as solders, lead, tin, woods metal, or the like. Alternatively, the bonding material may be a higher melting electroconductive metal or alloy such as, for example, copper, aluminum, or lead. Copper and aluminum are particularly preferred.

When the silicon work piece or member has received a surface treatment or coating, i.e., of copper or nickel or the like, various bonding materials, e.g., welding beads, welding electrodes, solders, adhesives, and resins and the like may be used. For example, copper, aluminum, lead, tin, zinc, lead-tin alloys, tin-antimony alloys, silver solders, copper-zinc alloys, copper-zinc-tin alloys, copper-tin alloys, and alloys of aluminum with copper, manganese, zinc, and magnesium may be used. For applications where high electroconductivity is desired, copper or aluminum may be advantageously used.

The use of such a surface coating also allows the use of resinous and adhesive materials such as epoxy resins.

A pool of the bonding material is formed in contact with the silicon work piece, i.e., the adherent material on the surface of the silicon work piece, and with the second work piece. By bonding material or bonding compound is meant a metal or alloy which forms a metallurgical bond between the treated surface of the silicon work piece and the second work piece, or a resinous material that forms an adhesive bond between the adherent material on the surface of the silicon and the second work piece.

By a liquid pool is meant a pool of the type normally present in metal joining such as is found at a consumable welding electrode, or in a solder, flux, or the like or in the uncured resin. This molten pool may be provided by metal packing, heated, for example by a resistance element, or in a furnace. Alternatively, the molten metal pool may be provided as a consumable electrode or even as a flux. The temperature of the molten metal pool is typically above the melting point of the metal bonding material, and below the melting points of both the silicon work piece and the second work piece. That is, when the silicon work piece has a melting point of from about 2,460°F to about 2,590°F as is common with silicon and alloys that are substantially silicon with up to 8 or 10 or even 15 percent of other materials, and the second work piece is iron or steel having a melting point of from about 2,500 to about 2,700°C, and a softening point of from about 1,400°C to about 1,600°C, the metallic bonding compound or material should preferably have a melting point below about 1,400°C.

When the bonding material is a metallic bonding material, the work pieces, i.e., the silicon work piece and the second work piece, are cooled to solidify the molten pool and join the silicon work piece to the other metallic work piece so as to form a metallurgical bond. This may be accomplished by removing the source of heat as the arc, the electrode, the resistance element, or removing the two work pieces from the furnace.

Alternatively, when the bonding material is a resinous material or an adhesive, a curing agent may be added to the resin so as to cure and solidify the resin.

The silicon work piece and the second metallic work piece may be joined together in various geometries to form a structurally and electrically sound contact. For example, they may be butted or lapped or even laminated.

In one exemplification of this invention, a metallic stud or connector is joined to the silicon work piece within an aperture therein so as to provide a means for removably mounting the silicon member having threaded bolt means or stud means on another member. According to this exemplification, an aperture is provided in the silicon member. This may be done by casting the aperture in the silicon ingot or by drilling the aperture, e.g., with a diamond-tip drill or carbide tip drill or the like. Thereafter, the silicon within the aperture is treated as described above, e.g., with an electroplated film of nickel or copper. The stud or threaded rod is inserted into the electrocoated aperture along the bonding material. When a metallic bonding material is utilized, the silicon member and stud or threaded rod may be heated so as to melt the flux, for example, by passing an electrical current from one of the metal members to the other metal member through the metal powder or flux thereby causing resistance heating and subsequent melting or molten bonding material may be poured into the aperture. Alternatively, an electrode may be inserted within the metal powder or flux, and energized or the members may be heated in a furnace to a high enough temperature to melt the flux, or even by a torch, for example, an oxygen acetylene torch or an oxygen hydrogen torch may be used to melt the flux. When the bonding material is a resinous or adhesive material, it may be poured into the aperture before or after inserting the stud in the aperture.

The method of this invention is particularly useful with the electroconductive silicon contemplated for use in fabricating anodes. Electroconductive silicon is silicon having a bulk electrical conductivity in excess of 100 (ohm-centimeters)-1 or even 1,000 (ohm-centimeters) −1 or more. Such electroconductive silicon is provided by the presence of dopant in the silicon. The dopant is generally either an electron donor or an electron acceptor. Suitable electron donors are phosphorous, arsenic, antimony, and bismuth. Suitable electron acceptors are boron, aluminum, gallium, and the like. Generally, for electrochemical applications, i.e., for use as electrodes, electron acceptors are preferred in that they appear to impart chemical resistance to the silicon.

The dopants useful in providing the electrical conductivity, which dopant may either be an electron acceptor or an electron donor, should be present in an amount greater than 0.01 weight percent in the elemental silicon, and preferably in excess of about 0.1 weight percent of the elemental silicon. Generally, the dopant should be less than about 3 weight percent of the silicon, and almost always less than 5 weight percent of the silicon. The presence of the small amount of the dopant serves to increase the electrical conductivity from about 10 (ohm-centimeters)$^{-1}$, or less, which is characteristic of semi-conductor and rectifier grades of silicon, to in excess of 100 (ohm-centimeters)$^{-1}$ and preferably to in excess of 1,000 (ohm-centimeters)$^{-1}$ or 10,000 (ohm-centimeters)$^{-1}$ or even higher, which is comparable to graphite and conventional metallic conductors.

Increased physical strength and castability, as well as a lower melting point, and more ready formation of adherent bonds with suitable fluxes metallic bonding materials and resinous and adhesive bonding materials may be provided by the presence of alloying agents such as aluminum, gallium, manganese, iron, cobalt, nickel, chromium, and molybdenum. These alloying agents, when present, may be present either as a silicide or as an alloy with silicon or as both a silicide and an alloy with silicon. Typically, these alloying agents, when present, may be present in an amount in excess of one-half percent by weight, preferably in excess of about 8 percent by weight, frequently as high as 30 percent by weight or even more, but generally not greatly in excess of 40 percent by weight. These alloying agents serve to increase the malleability and ductility of the elemental silicon. Elemental silicon as the term has been used herein is silicon having a formal valence of 0.

The silicon work piece, is typically in the form of a silicon casting. The silicon casting may either be provided with an aperture or groove therein or receiving the second metal member, or such aperture groove or opening may be mechanically provided therein, or the silicon work piece may be cast as one monolithic piece.

The second metal piece may be iron, cobalt, nickel, steel, stainless steel, copper, titanium, or even titanium-clad copper or steel-clad copper.

The structure made by this invention may be understood with reference to the figures. In the figures.

Figure 1:
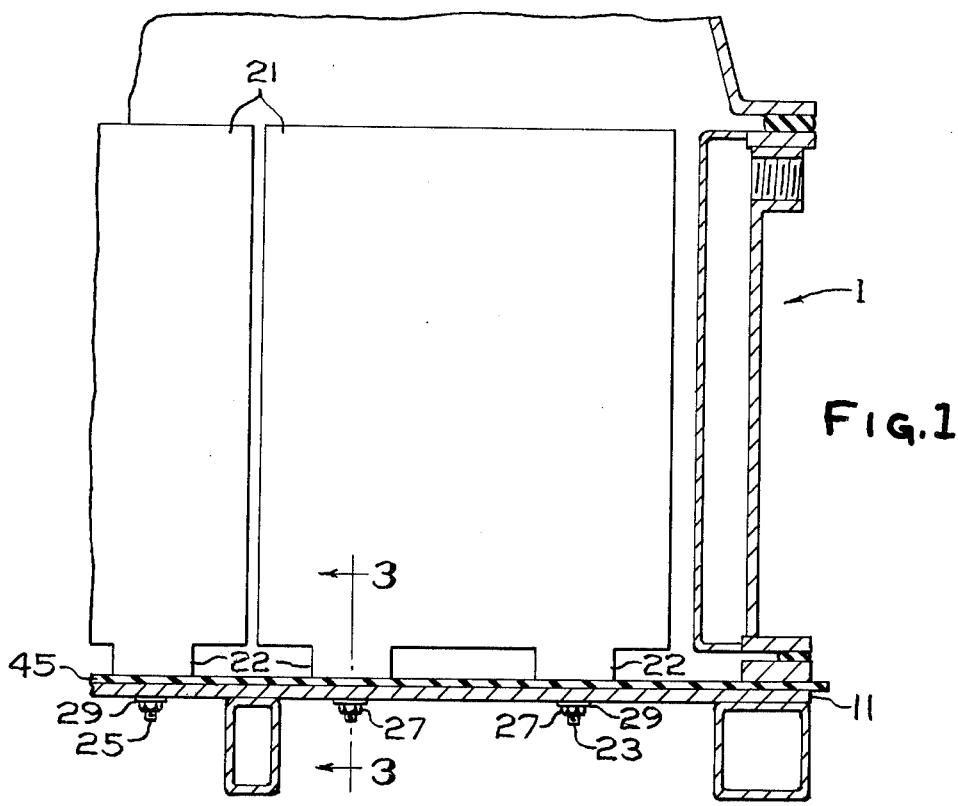
FIG. 1 shows partial cutaway of a monopolar electrolytic cell utilizing the silicon joint of this invention.
Figure 2:
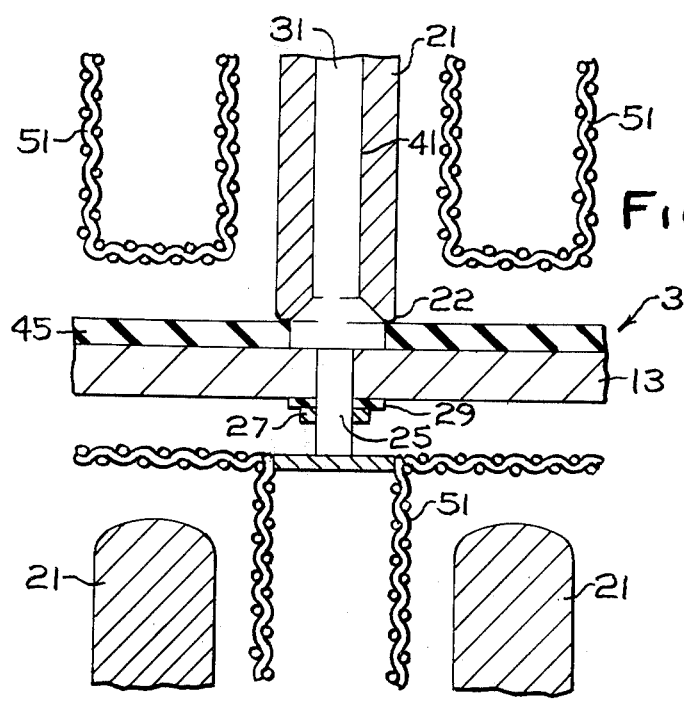
FIG. 2 is a partial cutaway of a bipolar electrolytic cell having a silicon anode and utilizing the silicon joint of this invention.
Figure 3:
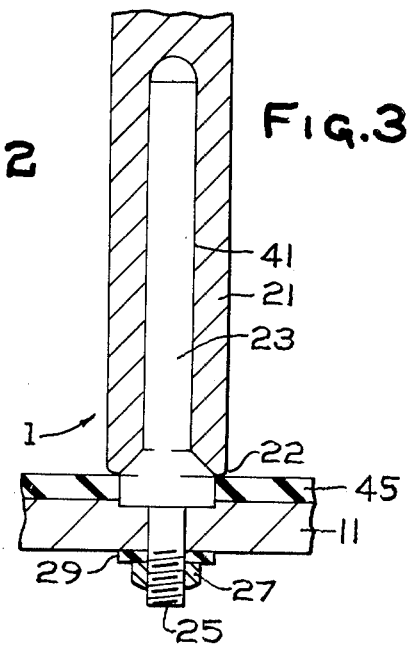
FIG. 3 is a section of FIG. 1 along 3 — 3 showing an anode having a silicon copper joint according to this invention.

As shown in FIGS. 1 and 3, an electrolytic cell 1 has a cell bottom 11. Extending upwardly from the cell bottom 11 is a silicon electrode 21. Extending from the bottom of the silicon electrode 21 is a stud 23. In the exemplification there shown, the stud 23 extends downward through the cell bottom 11 and terminates in a threaded portion 25 with a nut 27 and washer 29 thereon. The electrolytic cell 3 shown in FIG. 2 is a bipolar cell having a metal backplate 13 separating the cathodes 51 and catholyte chamber of one cell from the anodes 21 and anolyte chamber of the next adjacent cell. Within the first cell is a silicon anode 21 containing a copper stud 31. The copper stud 31 extends through the backplate 13 to the prior cell in the electrolyzer. Mounted on the copper stud 13 is a cathode 51 of the prior cell of the electrolyzer 3.

Turning now to FIG. 3, there is shown a silicon electrode 21 having an aperture 41 therein and mounted in cell structure of the type shown in FIG. 1. Welded within the aperture 41 is a stud 23 e.g., an electroconductive copper stud. The stud 23 is shown as being a monolithic copper member. However, it is to be understood that the stud 23 may be a copper member having a titanium clading on that portion of the stud extending beyond the silicon electrode 21. The silicon portion 22 of the anode 21 compresses a liner 45 on the bottom of the cell 1. A threaded portion 25 of the stud 23 extends through the liner 45 and metal cell bottom 11 terminating in a threaded portion 25. On the threaded portion 25 is a nut 27 and a washer 29 applying a compressive force on the cell base 11. In this way, the extended portion 22 of the silicon electrode 21 and the nut 27 and washer 29 apply a compressive force to the cell bottom maintaining the electrode rigidly in the cell.

The following example is illustrative.

EXAMPLE I

A silicon ingot was cast and an aperture core drilled therein. The aperture was coated with a copper film, a copper rod inserted into the aperture, and molten tin poured into the aperture to provide a welded fitting between the steel rod and the silicon ingot.

A graphite crucible was filled with 22 pounds of ferrosilicon, an actual iron content of 8 weight percent, and 187 grams of sodium tetraborate. The graphite crucible containing the ferrosilicon and sodium tetraborate was then heated to 1,435°C until complete fusion was obtained. The molten ferrosilicon was then poured into a graphite mold that had been preheated to 650°C.

After the ingot solidified, a ¾ inch diameter × 1½ inch deep aperture was core drilled. The aperture was then etched with an aqueous solution of one part hydrofluoric acid, two parts nitric acid, and seven parts water.

An electroplating solution containing 215 grams per liter of copper sulfate was prepared. Ten and eight tenth milliliters of this solution was then poured into the aperture cast in the silicon ingot. The silicon was made cathodic and a copper anode was inserted into the aperture. A current of 0.83 Amperes was fed to the cell providing a cathode current density of 30 Amperes per square foot. Electrolysis was continued for 30 minutes. A ⅜ inch diameter steel rod was then electroplated from a nickel electroplating solution containing 572 grams per liter of nickel sulfate hexahydrate, 46 grams per liter of anhydrous nickel chloride, and 38.4 grams per liter of boric acid for 15 minutes at 20 Amperes per square foot, followed by 15 minutes at 20 Amperes per square foot in a copper sulfate solution as described above.

The silicon ingot containing the steel rod was then placed into a furnace that had been preheated to a temperature of 290°C. Molten tin was poured into the aperture around the rod. Thereafter, the ingot was removed from the furnace and permitted to cool and the tin permitted to solidify. A strong weld was observed to have been formed between the silicon ingot and the steel rod.

EXAMPLE II

A ⅜ inch diameter steel rod was bonded into a 1¼ inches × 2 inches × 4 inches silicon work piece. The silicon work piece, containing about eight weight percent iron, about 0.4 weight percent boron, balance silicon, had ¾ inch diameter × 1⅛ inches deep core drilled aperture in the 1¼ inches × 2 inches surface. The interior of the aperture was electroplated with nickel from an electroplating bath prepared as described in Example I hereinabove.

The steel rod was cleaned and etched in 12 normal hydrochloric and then plated with nickel at a current density of 30 Amperes per square foot for 15 minutes. The silicon surface within the aperture was electroplated nickel at a current density of 50 Amperes per square foot for 45 minutes.

The silicon work piece and the steel rod were heated to 900°C and maintained thereat. A ladle of copper was heated to 1,200°C. The steel rod was then inserted in the aperture, and the molten copper poured into aperture around the rod. After the copper solidified the steel rod appeared to be securely bonded to the silicon work piece. The resistance measured through the rod, copper and silicon work piece, between a platinum strip on the rod one inch above the joint and another platinum strip on the silicon work piece 3½ inches below the joint was $3.4 \times 10^{-4}$ ohms.

EXAMPLE III

A ⅜ inch diameter steel rod was bonded into a 1¼ × 2 × 4 inches silicon work piece. The silicon work piece, containing about 8 weight percent iron, about 0.4 weight percent boron, balance silicon, and having a ¾ inch diameter by 1⅛ inches aperture in the 1¼ inches × 2 inches surface, was prepared as described in Example I.

The steel rod was cleaned and etched in 12 normal hydrochloric acid, and then electroplated first with nickel then with copper, each at 20 Amperes per square foot for 15 minutes. The silicon work piece was etched in an aqueous solution of one part hydrofluoric acid, two parts nitric acid, and seven parts water for 30 minutes. The aperture was then plated with copper at 30 Amperes per square foot for 30 minutes.

The rod and the silicon work piece were both heated to 290°C for 20 minutes, and then fluxed with $ZnCl_2$ flux. The rod was then inserted in the aperture and molten tin that had been preheated to 320°C was poured around the rod. The tin was then allowed to cool and solidify.

The electrical resistance of the joint was measured as described in Example II hereinabove and found to be about $3.0 \times 10^{-4}$ ohms.

The tensile strength was found to be 850 pounds per square inch.

EXAMPLE IV

A ½ inch diameter hand drawn copper rod was bonded to a 1¼ × 2 × 4 inches silicon work piece containing about 8 weight percent iron, about 0.4 weight percent boron, and balance silicon.

The silicon work piece had a ½ inch diameter by 1⅛ inches deep diamond core drilled hole. The inner of the hole was etched with a solution of one part hydrofluoric acid, two parts nitric acid, and seven parts water, and then copper plated at 20 Amperes per square foot for 2½ hours. The inside diameter of the aperture was 0.505 inch.

The copper rod was degreased with acetone, cleansed with "Comet" (TM) household cleaner, rubbed with No. 400 silicon carbide cloth, etched for three minutes in 5 normal nitric acid, rinsed with water, and dried with acetone. The outside diameter of the copper rod was 0.499 inch.

The inside of the aperture and the outside of the copper rod were coated with "Sweat-Tite" zinc chloride flux. The rod and the silicon work piece were then heated to melt the flux. A fifty percent tin-fifty percent lead solder was then applied to the surfaces, and the rod inserted in the work piece, and the assembly heated and cooled.

After the flux had solidified, the joint was found to have a resistance of $3.80 \times 10^{-4}$ ohms and a tensile strength of 1,140 pounds per square inch.

EXAMPLE V

A ½ inch diameter hand drawn copper rod was epoxy bonded to a 1¼ × 2 × 4 inches silicon work piece containing about 8 weight percent iron, about 0.4 weight percent boron, and balance silicon.

The silicon work piece had a ½ inch diameter by 1 inch deep diamond core drilled aperture. This aperture was etched with a solution of one part hydrofluoric acid, two parts nitric acid, and seven parts water. Thereafter a copper coating was plated on the inside surface at a current density of 25 Amperes per square foot for 120 minutes.

The copper rod was degreased, cleansed with "Comet" cleanser, etched in 5 normal nitric acid for 5 minutes, and rubbed with No. 400 emery cloth.

"56C Eccobond" epoxy solder was placed inside the aperture around the copper rod. After the epoxy solder cured, the contact resistance was measured as described in Example II hereinabove and found to be $1.65 \times 10^{-3}$ ohms. The tensile strength was measured and found to be 850 pounds per square inch.

It is to be understood that although the invention has been described with reference to specific details of particular embodiments thereof, it is not to be so limited as changes and alterations therein may be made which are within the full intended scope of this invention as defined by the appended claims.

We claim:
1. A silicon fabrication comprising:
  a silicon member;
  an electrodeposited coating of a material chosen from the group consisting of copper, nickel, tin, aluminum, zinc, silver, palladium, platinum, and gold on a surface of said silicon member;
  a second metallic member bonded to said silicon member by an electrically conductive epoxy resin bonding material bonded to said electrodeposited coating.

* * * * *